United States Patent
Lipunov et al.

(10) Patent No.: US 12,169,941 B1
(45) Date of Patent: Dec. 17, 2024

(54) SYSTEM AND METHOD FOR DETERMINING A POSITION AN OBJECT CROSSES A TARGET PLANE

(71) Applicant: RAPSODO PTE. LTD., Singapore (SG)

(72) Inventors: Evgeny Lipunov, Singapore (SG); Osman Murat Teket, Singapore (SG); Kelvin Soon Keat Yeo, Singapore (SG); Batuhan Okur, Singapore (SG)

(73) Assignee: Rapsodo PTE. LTD., Singapore (SG)

( * ) Notice: Subject to any disclaimer, the term of this patent is extended or adjusted under 35 U.S.C. 154(b) by 0 days.

(21) Appl. No.: 18/742,221

(22) Filed: Jun. 13, 2024

(51) Int. Cl.
*G06T 7/292* (2017.01)
*G06T 7/80* (2017.01)

(52) U.S. Cl.
CPC ............... *G06T 7/292* (2017.01); *G06T 7/85* (2017.01); *G06T 2207/30224* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 4,979,815 A | 12/1990 | Tsikos | |
| 8,908,922 B2 | 12/2014 | Marty et al. | |
| 9,036,864 B2 * | 5/2015 | Johnson | G06T 7/20 382/103 |
| 9,747,691 B2 * | 8/2017 | Holz | G06T 7/13 |
| 10,754,025 B2 | 8/2020 | Asghar et al. | |
| 10,894,198 B1 | 1/2021 | Teeger et al. | |
| 11,583,746 B2 * | 2/2023 | Xu | A63B 69/3658 |
| 11,767,312 B2 | 9/2023 | Lu et al. | |

(Continued)

FOREIGN PATENT DOCUMENTS

WO 2014/116882 A1 7/2014

OTHER PUBLICATIONS

Amato, A., et al. Trajectory Fusion for Multiple Camera Tracking. In: Kurzynski, M., Puchala, E., Wozniak, M., Zolnierek, A. (eds) Computer Recognition Systems 2. Advances in Soft Computing, vol. 45. Springer, Berlin, Heidelberg. https://doi.org/10.1007/978-3-540-75175-5_3 (Year: 2007).*

(Continued)

*Primary Examiner* — Soo Shin
(74) *Attorney, Agent, or Firm* — Scully, Scott, Murphy & Presser, PC (57) ABSTRACT

A system and method for determining a position an object moving along a trajectory crosses a target plane, by obtaining a plurality of images of an object moving along a trajectory in an environment, the plurality of images capturing the object at different positions along the trajectory, obtaining a plurality of images of an object moving along a trajectory in an environment, the plurality of images capturing the object at different positions along the trajectory, the plurality of images being obtained from two or more cameras positioned at different positions in the environment, each of the two or more cameras having a field of view (FOV) that includes the trajectory of the moving object and a target plane, the target plane being a plane that the moving object crosses during movement along the trajectory, each of the two or more cameras obtaining the images at a different timing.

22 Claims, 7 Drawing Sheets

(56) References Cited

U.S. PATENT DOCUMENTS

| | | | |
|---|---|---|---|
| 11,842,572 B2* | 12/2023 | Chojnacki | G06V 40/23 |
| 2003/0040815 A1* | 2/2003 | Pavlidis | G06V 10/24 |
| | | | 700/83 |
| 2009/0074246 A1* | 3/2009 | Distante | G06V 20/42 |
| | | | 706/46 |
| 2010/0303303 A1* | 12/2010 | Shen | G06V 40/20 |
| | | | 382/107 |
| 2012/0146291 A1 | 6/2012 | Walker | |
| 2012/0206597 A1* | 8/2012 | Komoto | G06V 20/58 |
| | | | 348/135 |
| 2014/0184494 A1* | 7/2014 | Burachas | G06F 3/017 |
| | | | 345/156 |
| 2014/0206146 A1 | 7/2014 | Holz et al. | |
| 2014/0327780 A1* | 11/2014 | Herrli Anderegg | |
| | | | G08B 13/19645 |
| | | | 348/159 |
| 2015/0260512 A1 | 9/2015 | Greiner et al. | |
| 2017/0213087 A1* | 7/2017 | Chen | G06V 20/42 |
| 2018/0137662 A1* | 5/2018 | Simeone | G06T 7/70 |
| 2019/0087661 A1* | 3/2019 | Lee | G06V 10/82 |
| 2021/0133983 A1* | 5/2021 | Hayashi | G06T 7/73 |
| 2021/0264141 A1* | 8/2021 | Chojnacki | G06V 40/25 |
| 2022/0051420 A1* | 2/2022 | Forsgren | G06T 7/292 |
| 2022/0138969 A1* | 5/2022 | Forsgren | G06T 7/251 |
| | | | 382/103 |
| 2023/0144415 A1 | 5/2023 | Connell | |
| 2023/0410507 A1 | 12/2023 | Hall et al. | |

OTHER PUBLICATIONS

Labayen et al., "Accurate ball trajectory tracking and 3D visualization for computer-assisted sports broadcast," Multimed Tools Appl (2014) 73:1819-1842. DOI 10.1007/s11042-013-1558-x (Year: 2014).*

Yu et al., "Trajectory-Based Ball Detection and Tracking with Aid of Homography in Broadcast Tennis Video," SPIE-IS&T/ vol. 6508 650809 (Year: 2007).*

Zhang et al., "Cross-Camera Tracking Model and Method Based on Multi-Feature Fusion," Symmetry 2023, 15, 2145. https://doi.org/10.3390/sym15122145 (Year: 2023).*

Bardsley et al., "3D Reconstruction Using the Direct Linear Transform with a Gabor Wavelet Based Correspondence Measure", Technical Report, Jun. 21, 2006, pp. 1-11.

Kagan et al., "Statcast and the Baseball Trajectory Calculator", The Physics Teacher, Mar. 2017, pp. 134-136, vol. 55.

* cited by examiner

SYSTEM AND METHOD FOR DETERMINING A POSITION AN OBJECT CROSSES A TARGET PLANE

BACKGROUND

The present invention relates to object tracking and more particularly to determining a plurality of positions of the object along a trajectory.

Many technologies and fields may benefit from imaging analysis to identify whether: a tennis serve was on the line, a foot was inbounds, a ball touched the ground, illegal contact was made, a baseball strike crossed home plate, etc. Such examples of imaging analysis may be used in review processes of events after they occur, now common in a variety of sports.

In baseball, the strike zone is the area over home plate from the midpoint between a batter's shoulders and the top of the uniform pants and a point just below the kneecap, when the batter is in his stance and prepared to swing at a pitched ball. The strike zone is also defined as the volume of space through which a pitch must pass in order to be called a strike even though the batter does not swing. The strike zone is used for determining if a pitch is a strike or not, which is an important part of the game of baseball.

While most of the object tracking methods uses two cameras to determine the baseball crossing the strike zone described above, such methods are complex and generally require the object to be found on both cameras at the same point in time i.e. hard synchronization. Therefore, there is a need to provide a method that overcomes the above limitations.

SUMMARY

Embodiments of the present disclosure are directed to a method for determining a position an object moving along a trajectory crosses a target plane. In some embodiments, the method includes obtaining a plurality of images of an object moving along a trajectory in an environment. In some embodiments, the plurality of images captures the object at different positions along the trajectory. In some embodiments, the plurality of images is obtained from two or more cameras positioned at different positions in the environment. In some embodiments, each of the two or more cameras obtain the images at a different timing. In some embodiments, each of the two or more cameras has a field of view (FOV) that includes the trajectory of the moving object and a target plane. In some embodiments, the target plane is a plane that the moving object crosses during movement along the trajectory.

In some embodiments, each of the two or more cameras is in communication with at least one processor. In some embodiments, the method includes determining, by the at least one processor, a plurality of the different positions of the object in a respective trajectory in a respective 2D camera plane for each of the two or more cameras. In some embodiments, the method includes determining, by at the least one processor, a plurality of the different positions of the object in a respective trajectory for each of the two or more cameras in a 2D common plane using the plurality of different positions of the object in the respective trajectory in the 2D camera plane for each of the two or more cameras. In some embodiments, the method includes determining, by the at least one processor, a position the object moving along the trajectory crosses the target plane using the plurality of different positions of the object in the respective trajectory in the 2D common plane for each of the two or more cameras. In some embodiments, the method may further include determining, by the at least one processor, a time the object moving along the trajectory crosses the target plane using the position the moving object crosses the target plane. In some embodiments, the object is a baseball thrown from a launch position toward a strike zone, the target plane is the strike zone, and the determined time is the time the baseball crosses the strike zone.

In some embodiments, the method may also include calibrating each of the two or more cameras in the environment. In some embodiments, the method may include obtaining, from the calibration, a first homography matrix for each of the two or more cameras. In some embodiments, the first homography matrix describes a projection from 3D coordinates to 2D coordinates, for example, if a 3D calibration pattern is used. In some embodiments, after calibrating the cameras, the method may include obtaining a plurality of images capturing the object at different positions moving along a trajectory. In some embodiments, the method may include determining coordinates of the plurality of the different positions of the object in a respective trajectory in a 2D camera plane for each of the two or more cameras using the first homography matrix for each of the two or more cameras.

In some embodiments, the method may further include converting the coordinates of the plurality of different positions of the object in the respective trajectory in the 2D camera plane for each of the two or more cameras to a 2D common plane using a second homography matrix for each of the two or more cameras to determine the plurality of different positions of the object in the respective trajectory in the 2D common plane for each of the two or more cameras. In some embodiments, the second homography matrix describes a projection from 2D camera coordinates to the 2D common plane.

In some embodiments, the method may also include determining the position the respective trajectories for each of the two or more cameras intersect in the 2D common to obtain the position the object moving along the trajectory crosses the target plane. In some embodiments, the method may also include projecting the position the object moving along the trajectory crosses the target plane back to the 2D camera plane for each of the two or more cameras. In some embodiments, the method may include using the second homography matrix for projecting the position the object moving along the trajectory crosses the target plane back to the 2D camera plane for each of the two or more cameras. In some embodiments, the method may include determining the time the object moving along the trajectory crosses the target plane using a cross-ratio of the plurality of different positions and the projected back position of the object, and a corresponding time stamp of the plurality of different positions and the projected back position of the object, in a selected 2D camera plane. In some embodiments, the time the object moving along the trajectory crosses the target plane is a local camera time for each of the two or more cameras.

Embodiments of the present disclosure are directed to a system including one or more processors and non-transitory computer readable media that include instructions thereon that, in response to execution by the one or more processors, control performance of operations of the one or more processors for determining a position an object moving along a trajectory crosses a target plane, by obtaining a plurality of images of an object moving along a trajectory in an environment, the plurality of images capturing the object at different positions along the trajectory, obtaining a plurality of images of an object moving along a trajectory in an environment, the plurality of images capturing the object at different positions along the trajectory, the plurality of images being obtained from two or more cameras positioned at different positions in the environment, each of the two or more cameras having a field of view (FOV) that includes the trajectory of the moving object and a target plane, the target plane being a plane that the moving object crosses during movement along the trajectory, each of the two or more cameras obtaining the images at a different timing.

The operations of the one or more processors are also controlled for determining a plurality of the different positions of the object in a respective trajectory in a respective 2D camera plane for each of the two or more cameras, determining a plurality of the different positions of the object in a respective trajectory for each of the two or more cameras in a 2D common plane using the plurality of different positions of the object in the respective trajectory in the 2D camera plane for each of the two or more cameras, determining a position the object moving along the trajectory crosses the target plane using the plurality of different positions of the object in the respective trajectory in the 2D common plane for each of the two or more cameras and determining a time the object moving along the trajectory crosses the target plane using the position the moving object crosses the target plane.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

Further features as well as the structure and operation of various embodiments are described in detail below with reference to the accompanying drawings. In the drawings, like reference numbers indicate identical or functionally similar elements.

DETAILED DESCRIPTION

Embodiments of the present disclosure are directed to a method and system for determining a time an object moving along a trajectory crosses a target plane. In baseball, the method and system of the present disclosure can be implemented for determining a time a baseball crosses the strike zone. Although the example provided in the present disclosure relates to a baseball environment, the invention may also be implemented in other sports including but are not limited to football, cricket, tennis, basketball as well as golf, etc. For example, in cricket, the method and system described herein can be implemented for a beehive zone. There are also planes for football (goal posts) and soccer (the post of the goal net). For tennis and basketball, ground planes can be considered as a plane. Additionally, the method and system of the present disclosure can also be extended to any object crossing a plane (e.g., the plane above the ground), in addition to a ball. This would include a golf club, a baseball bat, a cricket bat and parts of the player's body. For the non-ball object, determination can be made when for example leg of the player crosses the plane above the ground of the finish line in a race or when the player extends the football across the goal line in American football.

In baseball, the method and system of the present disclosure obtain an accurate measurement of the baseball in and close to the strike zone. From accurately measuring the ball in the strike zone, an accurate measurement of the strike time can be determined. The strike time can be defined as the time when the pitched ball crosses the front face of the strike zone. With the strike zone and strike time, it is possible to accurately obtain ball trajectory and break numbers.

In some embodiments, the method and system disclosed is incorporated in a launch monitoring device for evaluating the efficiency and performance of the players. The device can be used during an actual game or for training. For example, in baseball, the quality of a pitcher is generally judged by traditional baseball metrics including the pitcher's earned run average, wins, and/or saves. Pitches are generally judged based on whether the ball is in the strike zone, whether a batter is able to hit the pitch, and/or the result of the pitch (e.g., a strike, ball, foul ball, hit, etc.). Further, it is common to classify pitches based on the trajectory and/or speed of a pitch where such classifications include, for example, fastball, four-seam fastball, two-seam fastball, cutter (or cut fastball), forkball, splitter, sinker, breaking ball, curve ball, slider, changeup ball, etc. The trajectory of a pitch can be broken down into components such as rise, breaking point, final location, total break, etc. The trajectory metric can be a function that determines the quality of a pitch based on the rise, breaking point, final location, and total break of the pitch.

In some implementations, the trajectory metric can be a mathematical combination (e.g., a linear combination) of these components. In some embodiments, the pitch metrics can be independent of the batter facing the pitcher at the time of the pitch. For example, a standard strike zone can be used that does not depend on the batter (e.g., the strike zone is independent of the batter's height, batting stance, etc.). In some embodiments, the strike zone location of the baseball can be used to rate pitches because pitches at certain locations are more difficult for the batter to hit than other locations.

In some embodiments, the pitches can be characterized based on the location and the particular batter facing the pitcher at the time of the pitch. For example, the strike zone location of the trajectory can be used to define desired locations for a particular batter that will have a better chance of the batter making an out instead of a hit. This can take into account the batter's size, stance, and other factors. This can allow for coaches and pitchers to determine the quality of pitches thrown to particular batters, accounting for batter tendencies, preferences, weaknesses, etc.

In some embodiments, the method and system of the present disclosure comprise two or more cameras. In some embodiments, the two or more cameras may be placed arbitrarily in an environment, for example on a field, provided the strike zone is within the field of view (FOV) of the cameras. In some embodiments, the cameras are arranged such that the cameras are spaced apart horizontally but not vertically (i.e., one camera above another).

The method and system of the present disclosure can track the baseball or other objects moving in a straight line and/or a curved line which enables different trajectories and camera setups to be used. Advantageously, the method and system of the present disclosure do not require hard synchronization methods to identify the strike zone position and strike time accurately. Hard synchronization is where two or more devices are synchronized by a timer (using a common timer) and the two or more devices capture camera frames synchronously (share hard-wired external camera sync signal). The frames are captured synchronously, and correspondence of different camera frames is known by common timestamps. The method and system of the present disclosure do not require the cameras to be in-sync. Instead, the cameras can be asynchronous cameras and the method and system of the present disclosure use event-based synchronization. Therefore, the method and system of the present disclosure can be applied without the need for any of the two or more cameras to have knowledge of what any of the other cameras is doing. In some embodiments, a calibration can be performed using standard 2D calibration patterns for e.g. on a small checkerboard or 3D calibration patterns to calibrate each of the cameras to the strike zone plane, prior to using the cameras for tracking the moving objects. Moreover, the objects do not have to share timestamps unlike the traditional stereo imaging. The method and system of the present disclosure can thus be applied to a system where there is no common time reference.

The system and method of the present disclosure use event-based time synchronization because from detection of the moving object and virtual plane crossing, the time synchronization (event-based) is recovered. Specifically, as the cameras used in the system and method of the present disclosure initially have no knowledge of the other cameras including time sync (such as a time delay) relative to each other, an event such as the moving object crossing the virtual plane described herein can be used as a common event or reference to determine a time reference for the respective camera and thus useful for camera synchronization. Since the system and method of the present disclosure include synchronization of unsynchronized cameras i.e., event-based synchronization, the system and method of the present disclosure can be extended for synchronizing two or more unsynchronized cameras in general. Thus, the system and method of the present disclosure can be used to synchronize unsynchronized cameras for other applications requiring synchronization. In the system and method of the present disclosure, the moving object crossing the virtual plane, i.e., the 2D common plane, is used for synchronization of the two or more unsynchronized cameras. Thus, the disclosed method and system are not limited to determining the strike time.

Figure 1:
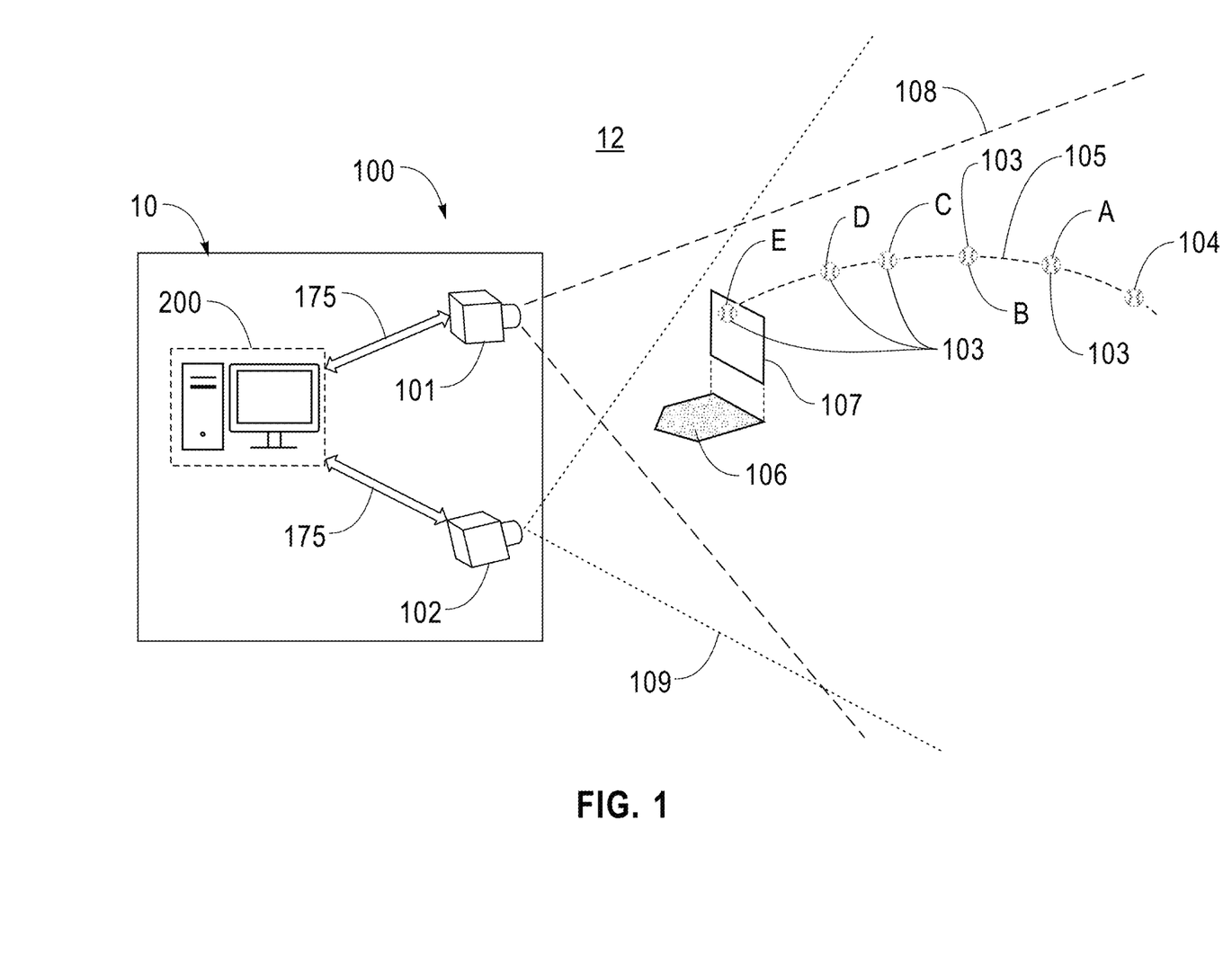
FIG. 1 is a schematic diagram of one embodiment of a system for determining a position and corresponding time an object moving along a trajectory crosses a target plane.

FIG. 1 is a schematic diagram of an object tracking system 10 employing two or more camera devices 100 for determining a time an object moving along a trajectory crosses a target plane. The embodiment of the system 10 shown in FIG. 1 employs two camera devices 101, 102. However, as noted above, more than two camera devices 100 may also be employed. The camera devices 100 are capable of wired or wireless communication with a computing device 200 for performing object tracking and target plane detection operations. In some embodiments, the camera devices 100 and the computing device 200 are implemented in a single monitoring device. In other embodiments, one or more camera devices 100 are implemented in a single monitoring device with computing device 200 and one or more other camera devices 100 are just cameras. For example, in one embodiment, the camera device 101 and the computing device 200 are implemented in a single monitoring device and camera 102 is a camera only, where camera 102 is in communication with the computing device 200. Hence, images obtained by camera 102 can be processed by the computing device 200. In other embodiments, all the camera devices 100 are just cameras in communication with computing device 200.

The camera devices 101 and 102 obtain a plurality of images of an object moving along a trajectory. In some embodiments, the system is located in an environment, such as a sports field. FIG. 1 depicts, as one example, a baseball field environment 12, in which a pitcher (not shown) throws a baseball 103 from a release point 104 along a trajectory 105 towards home plate 106. The strike zone 107 is the area above home plate 106 from the midpoint between a batter's shoulders and the top of the uniform pants and a point just below the kneecap. The strike zone 107 is the target plane 107. The cameras devices 101 and 102, are positioned in the environment 12 such that each of the camera devices 101 and 102 have an image capture FOV that includes the trajectory 105 of the moving object, the baseball 103 in this example and the target plane 107. As shown, camera device 101 has FOV 108 and camera device 102 has FOV 109. As shown, both FOV 108 and 109 include the strike zone 107 and the baseball trajectory 105. In some embodiments, FOV 108 and FOV 109 may be substantially the same FOV. In some embodiments, the FOV of each of the cameras may also include the launch position or release point 104 of the baseball. The camera devices 101 and 102 each obtain a plurality of images that capture the baseball 103 at different positions along the trajectory 105. In some embodiments, each of the cameras devices 101 and 102 obtain the images at a different timing. FIG. 1 depicts five ball positions A, B, C, D, E along the trajectory 105 at different time $t_A$, $t_B$, $t_C$, $t_D$ and $t_E$, respectively. Positions A, B, C, D are between the release point 104 and the strike zone 107 and position E is where the baseball 103 crosses the strike zone 107.

Figure 2A:
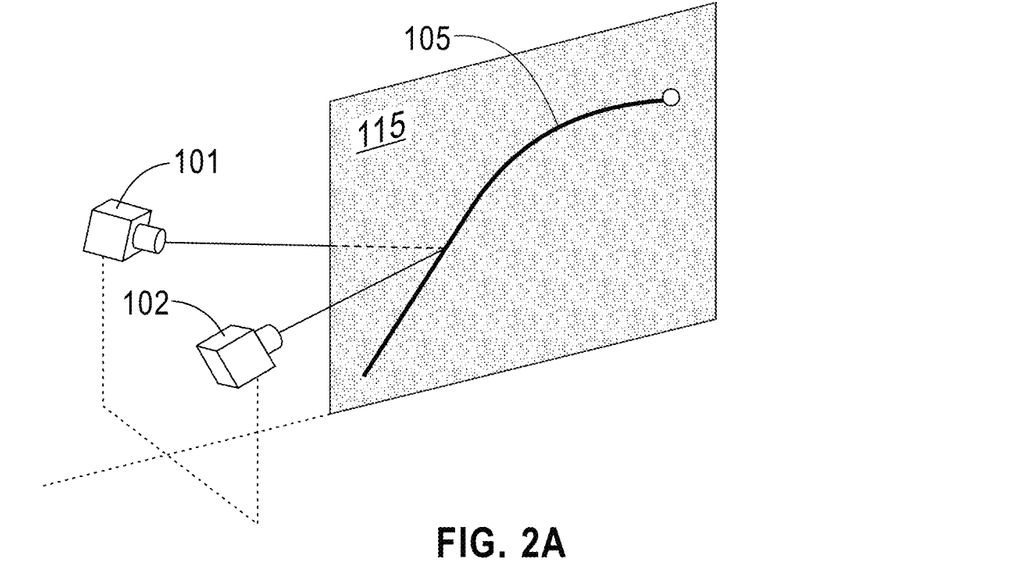
FIG. 2A and FIG. 2B are schematic diagrams showing positions of the camera devices relative to the plane of the trajectory of the moving object.
Figure 2B:
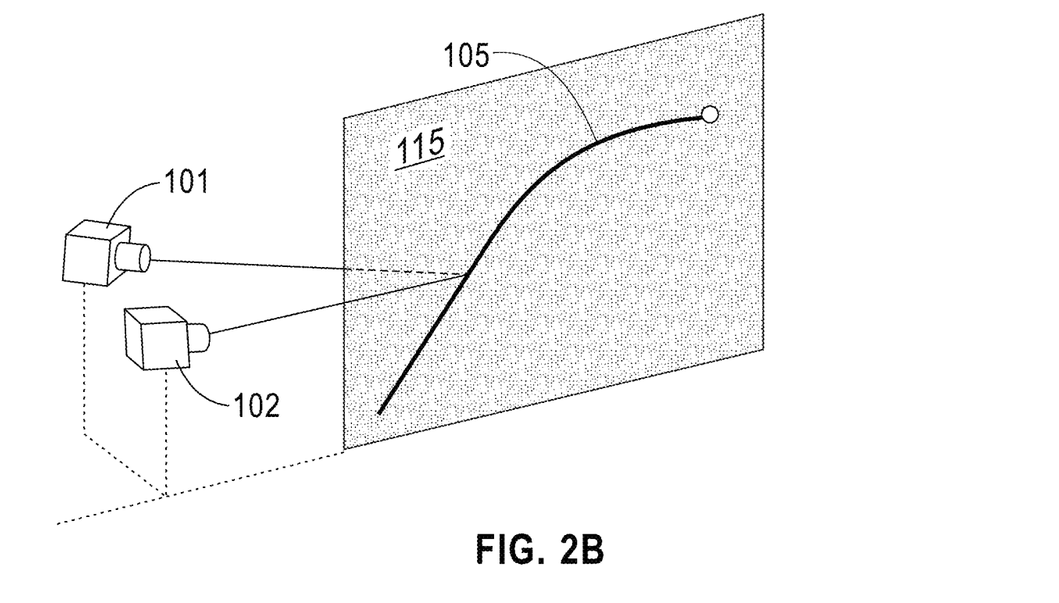

In some embodiments, the camera devices 100 are positioned relative to the trajectory of the moving object such that none of the camera devices are pointed in line with the plane of the trajectory of the moving object. For example, as shown in FIG. 2A, the camera device 101 and the camera device 102 are both not pointed in line with the plane 115 of trajectory 105. In some embodiments, the camera devices 100 are positioned relative to the trajectory of the moving object such that some of the camera devices are pointed in line with the plane of the trajectory of the moving object and some of the camera devices are not pointed in line with the plane of the trajectory of the moving object. For example, as shown in FIG. 2B, the camera device 101 is not pointed in line with the plane 115 of trajectory 105 but camera device 102 is pointed in line with the plane 115 of trajectory 105.

Figure 3:
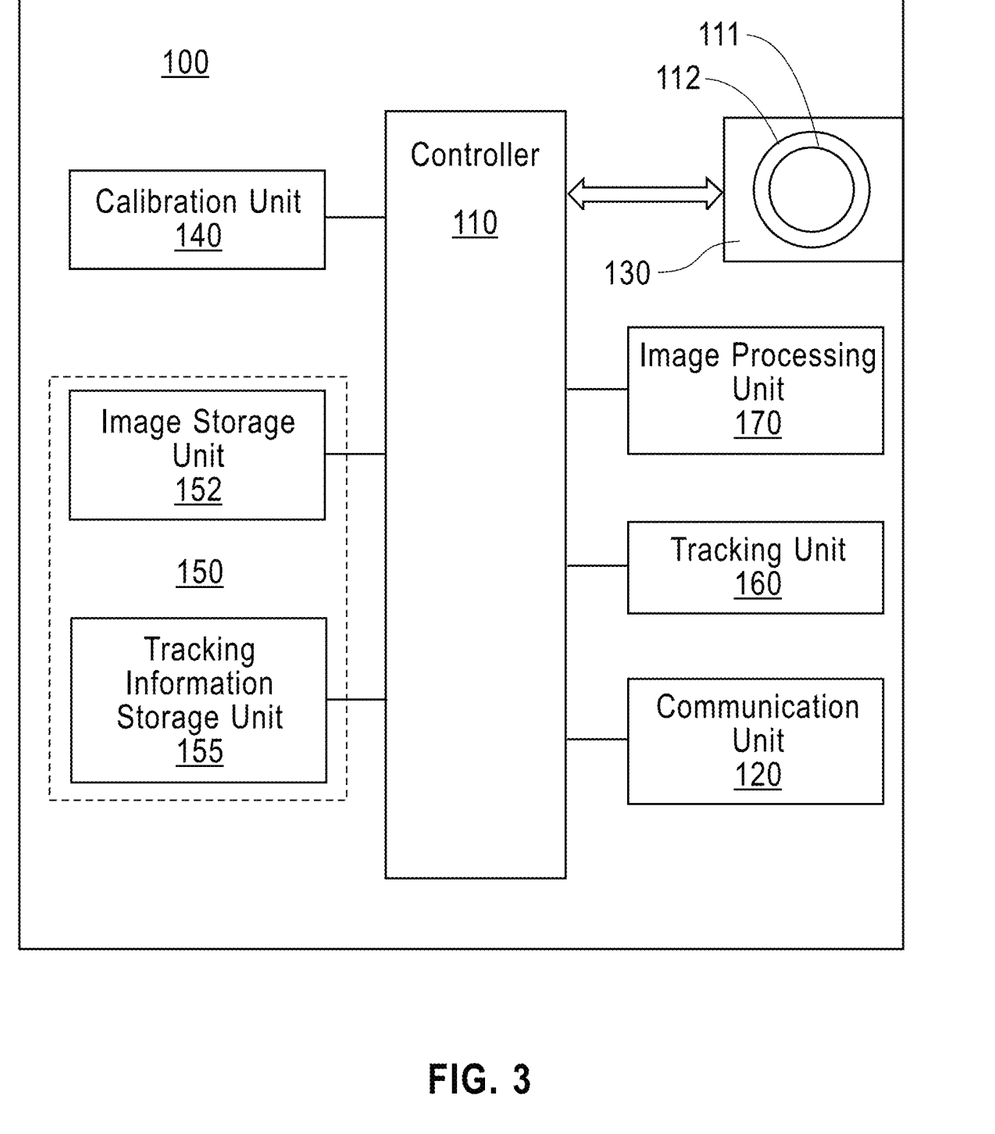
FIG. 3 is a schematic diagram of one embodiment of a camera employed in the system of FIG. 1.

The details of each camera device 100 are shown in FIG. 3. In some embodiments of the present disclosure, the camera devices 100 may include any device, system, component, or collection of components configured to capture images and/or video. In some embodiments, the camera of the camera devices 100 may include an image capture unit 130 which can include a lens 111, an image sensor 112, a digital signal processor or controller 110 which can include one or more hardware microprocessors, a communication unit 120 that is connected to and controlled by the controller 110, an image capture unit 130 for capturing images and/or video, a calibration unit 140 for controlling camera calibration operations, a memory 150, a tracking unit 160, and an image processing unit 170.

In some embodiments, the image capture unit 130 may include additional optical elements such as filters. The image sensor 112 upon which an image may be recorded may include any device that converts an image represented by incident light into an electronic signal. The image sensor 112 may include a plurality of pixel elements, which may be arranged in a pixel array (e.g., a grid of pixel elements) for acquiring an image. For example, the image sensor 112 may comprise a charge-coupled device (CCD) or complementary metal-oxide-semiconductor (CMOS) image sensor. The pixel array may include a two-dimensional array with any aspect ratio. The image sensor 112 may be optically aligned with various optical elements that focus light onto the pixel array, for example, lens 103. Any number of pixels may be included such as, for example, hundreds or thousands of megapixels, etc.

In an embodiment, the image capture unit 130 acquires an image under the control of the controller 110, and the acquired image is stored in the memory storage unit 150 under the control of the controller 110. Further data and information for operation of the camera 100 can be stored in the memory 150. Then, the image acquired in the image capture unit 130 is stored in the memory 150. The acquired images have respective pieces of unique identification information, and the pieces of identification information can correspond to points of time, respectively, at which the images are acquired. In addition, other types of tracking information that are detected from at least one image may include the pixel positions of an object in motion being tracked. The pixel positions can also be stored in the memory 150. A storage area of the memory 150, in which the images are stored, can be hereinafter alternatively referred to as an image storage unit 152, and a storage area of the memory 150, in which "tracking information" associated with target object tracking are stored, is hereinafter referred to as a tracking information storage unit 155. The image processing unit 170 is further provided to perform types of digital signal processing to raw camera image data, e.g., filtering, noise reduction, image sharpening, etc.

As further shown in FIG. 3, camera devices 100 can include a communication unit 120 to enable the camera to receive remote control signals for performing camera operations in connection with object tracking and strike zone detection information and includes at least one module for performing wired and/or wireless communication with a remote control processor or remote computing apparatus 200. The communication unit 120 receives a control signal from a remote control processor or computing apparatus 200 through at least such module and can transfer an acquired image to the remote control processor or computing apparatus 200 under the control of the controller 110.

Whether remotely or locally controlled using controller 110, each camera device 100 may operate at certain frame rates or be able to capture a certain number of images in a given time. The camera 100 may operate at a frame rate of greater than or equal to about sixty frames per second (fps), for example between about one hundred and about three hundred frames per second (fps). In some embodiments, a smaller subset of the available pixels in the pixel array may be utilized to allow for the camera to operate at a higher frame rate.

The tracking unit 160 operates to detect a moving target object being tracked and determine the position and time the target object crosses the target plane. In an embodiment, any number of a variety of triggers may be used to cause the camera device 100 to capture one or more images of the moving object. By way of non-limiting examples, the camera device 100 may be triggered upon receipt of a timed activation signal, or when the moving object is detected, known or estimated to be in the field of view of the camera, or when the moving object first begins or modifies its flight (for example when a baseball is pitched, when a baseball is batted, when a golf ball is struck, when a tennis ball is served, when a cricket ball is bowled, etc.), or when a moving object is detected at a leading row of pixels in the pixel array, etc.

In an embodiment, the remote control processor or computing apparatus 200 can control overall operation of the camera devices 100 that can be physically spaced apart to perform object tracking and detection according to the embodiment of the present disclosure. The computing apparatus 200 can control the image capture unit 130 according to the control signals 175 that is received through the communication unit 120 and to configure the controller 110 to acquire an image. Subsequently, the controller 110 can store the acquired image at the device and/or can transmit the stored image and the related image identification, tracking information and strike zone detection information to the computing apparatus 200 for further processing. The further processing can include the application of one or more algorithms to receive raw camera image data in a series of image frames. For example, in accordance with embodiments herein, an example camera measurement of a moving object may include, but is not limited to identifying, in each of the images, one or more of: a radius of the object, a center of the object, a velocity, an elevation angle, and an azimuth angle, e.g., calculated based on the radius of the object, the center of the object, and any pre-measured camera alignment values.

Figure 4:
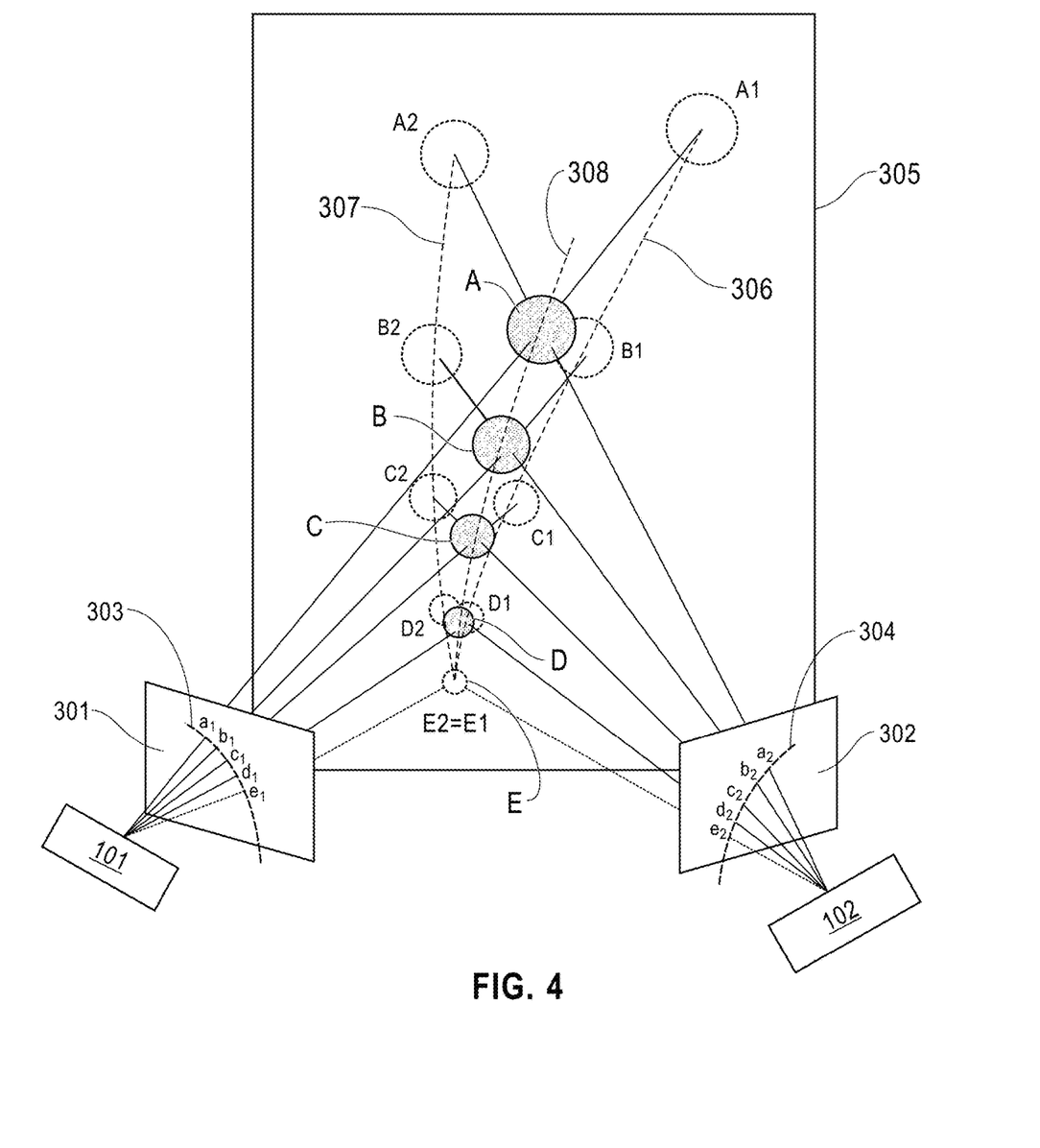
FIG. 4 is a schematic diagram of the camera planes and the 2D virtual common plane for determining the position in the strike zone and the strike time for a curved baseball trajectory in one embodiment of the present disclosure.

FIG. 4 is a schematic diagram of the 2D camera planes and the 2D virtual common plane to determine the position of the strike zone and the strike time for a curved ball trajectory in one embodiment of the present disclosure. Although the example disclosed hereon is with respect to an object moving in a curved trajectory, the concepts and equations disclosure may likewise be implemented for a straight line or linear trajectory. In this embodiment, there are two of the cameras 101 and 102 as described above in FIGS. 1-3. Whether synchronous or asynchronous cameras are used, calibration needs to be performed to obtain a first homography matrix for each camera 101 and 102 i.e. first homography matrix for camera 101 and first homography matrix for camera 102. The first homography matrix for each camera 101 and 102 describes a projection from 3D coordinates, for example of a 3D calibration pattern, to 2D coordinates of the camera plane. The homography matrices ($H_{3D}$) obtained from the calibration is a 4×3 matrix describing the projection from 3D world coordinate to 2D camera coordinate, also known as a camera plane or a 2D camera plane. It is to be understood that the first homography matrix may also describe a projection from 2D coordinates to another 2D coordinates when 2D calibration pattern is used instead of 3D calibration pattern. Any camera calibration method can be used for this purpose, as long as the first homography matrix is obtained from the calibration.

An example of a 3D to 2D homography matrix that may be implemented in some embodiments is disclosed in U.S. Ser. No. 18/595,592, the entire disclosure of which is incorporated herein by reference.

Another example of the 3D to 2D homography matrix is:
3D world to 2D plane projection constraint: $q \propto H_{3D}p$, where:

$\vec{q} = \{q_x, q_y, 1\}$ is 2D image point, $\vec{p} = \{p_x, p_y, p_z, 1\}$ is 3D world point, $H_{3D} = \{h_{xx}, h_{xy}, h_{xz}; h_{yx}, h_{yy}, h_{yz}; h_{zx}, h_{zy}, h_{zz}; h_x, h_y, h_z = 1\}$ is a 3D homography matrix, or a 3D to 2D projection matrix.

Projection by Elements:

$$q_x = \frac{p_x h_{xx} + p_y h_{yx} + p_z h_{zx} + h_x}{p_x h_{xz} + p_y h_{yz} + p_z h_{zz} + h_z};$$

$$q_y = \frac{p_x h_{xy} + p_y h_{yy} + p_z h_{zy} + h_y}{p_x h_{xz} + p_y h_{yz} + p_z h_{zz} + h_z};$$

World Plane Constraint:

$(\vec{p} \cdot \vec{n}) = p_x n_x + p_y n_y + p_z n_z = d$, where $\vec{n} = \{n_x, n_y, n_z, d\}$ are parameters of the plane.

Combine the Above Equations Together:

$$q_x = \frac{p_x \left(\frac{n_z h_{xx} + n_x h_{zx}}{n_z h_z - dh_{zz}}\right) + p_y \left(\frac{n_z h_{yx} + n_y h_{zx}}{n_z h_z - dh_{zz}}\right) + \left(\frac{n_z h_x - dh_{zx}}{n_z h_z - dh_{zz}}\right)}{p_x \left(\frac{n_z h_{xz} + n_x h_{zz}}{n_z h_z - dh_{zz}}\right) + p_y \left(\frac{n_z h_{yz} + n_y h_{zz}}{n_z h_z - dh_{zz}}\right) + 1};$$

$$q_y = \frac{p_x \left(\frac{n_z h_{xx} + n_x h_{zx}}{n_z h_z - dh_{zz}}\right) + p_y \left(\frac{n_z h_{yx} + n_y h_{zx}}{n_z h_z - dh_{zz}}\right) + \left(\frac{n_z h_x - dh_{zx}}{n_z h_z - dh_{zz}}\right)}{p_x \left(\frac{n_z h_{xz} + n_x h_{zz}}{n_z h_z - dh_{zz}}\right) + p_y \left(\frac{n_z h_{yz} + n_y h_{zz}}{n_z h_z - dh_{zz}}\right) + 1}$$

So that $H_{2D}$ per virtual plane defined by n is:

$$H_{2D}(\vec{n}) = \left\{\left(\frac{n_z h_{xx} + n_x h_{zx}}{n_z h_z - dh_{zz}}\right), \left(\frac{n_z h_x - dh_{zx}}{n_z h_z - dh_{zz}}\right), \left(\frac{n_z h_x - dh_{zx}}{n_z h_z - dh_{zz}}\right), \left(\frac{n_z h_{xx} + n_x h_{zx}}{n_z h_z - dh_{zz}}\right),\right.$$
$$\left.\left(\frac{n_z h_{yx} + n_y h_{zx}}{n_z h_z - dh_{zz}}\right), \left(\frac{n_z h_x - dh_{zx}}{n_z h_z - dh_{zz}}\right), \left(\frac{n_z h_{xz} + n_x h_{zz}}{n_z h_z - dh_{zz}}\right), \left(\frac{n_z h_{yz} + n_y h_{zz}}{n_z h_z - dh_{zz}}\right), 1\right\}$$

Once the cameras are calibrated, the cameras are used for tracking the moving object. Each of the cameras captures several images at different timing and recovers 2D camera coordinates in the 2D camera plane. In the example depicted in FIG. 4, each camera 101 and 102 has obtained four images of the baseball 103 moving along the trajectory 105. Each image captures the baseball 103 at a different one of the positions A, B, C and D along the trajectory 105. The tracking unit 160 determines the different positions of the baseball 103 in a respective trajectory in a respective 2D camera plane for each of the two cameras. In some embodiments, the tracking unit 160 determines pixel coordinates of the plurality of the different positions of the baseball A, B, C and D in a respective trajectory in a 2D camera plane for each of the two or more cameras using the first homography matrix for each of the two or more cameras. In the example of FIG. 4, the tracking unit 160 determines the baseball positions $a_1$-$b_1$-$c_1$-$d_1$ in trajectory 303 in a 2D camera plane 301 for camera 101. In addition, the tracking unit 160 determines the baseball positions $a_2$-$b_2$-$c_2$-$d_2$ in a trajectory 304 in a 2D camera plane 302 for camera 102.

Next, the tracking unit 160 determines a plurality of the different positions of the baseball 103 in a respective trajectory for each of the cameras 101 and 102 in a 2D common plane 305 using the plurality of different positions of the baseball in the respective trajectories 303 and 304 in the respective 2D camera planes 301 and 302 for each of the cameras 101 and 102. In some embodiments, the tracking unit 160 converts the pixel coordinates of the plurality of different positions of the baseball 103 in the respective trajectories 303 and 304 in the respective 2D camera planes 301 and 302 for each of the cameras 101 and 102 to the 2D common plane 305. In some embodiments, the 2D camera coordinates are converted to the common 2D plane 305 associated with the target plane, the strike zone 107, using a second homography matrix ($H_{2D(n)}$). The common 2D plane 305 may be a virtual plane, a real plane, oriented horizontally, oriented vertically, angled or tilted or a grid of planes. The second homography matrix ($H_{2D}$) is a 3×3 matrix describing the projection from 2D camera coordinate to 2D virtual plane. An example of an ($H_{2D}$) 3×3 matrix is described in the Technical Report by Daniel Bardsley and Bai Li titled: 3D Reconstruction Using the Direct Linear Transform with a Gabor Wavelet based Correspondence Measure.

In the example depicted in FIG. 4, the tracking unit 160 determines the positions A1-B1-C1-D1 of the baseball 103 in a trajectory 306 in the common plane 305. The trajectory 306 and the positions A1-B1-C1-D1 are obtained by a projection of trajectory 303 from 2D camera plane 301 of camera 101 to the 2D common plane 305. Likewise, the tracking unit 160 determines the positions A2-B2-C2-D2 of the baseball 103 in a trajectory 307 in the 2D common plane 305. The trajectory 307 and the positions A2-B2-C2-D2 are obtained by a projection of trajectory 304 from 2D camera plane 302 of camera 102 to the 2D common plane 305.

In some embodiments, the tracking unit 160 uses a second homography matrix for each of the cameras 101 and 102 to determine the plurality of different pixel positions of the baseball in the respective trajectories 306 and 307 in the 2D common plane 305 for each of the cameras 101 and 102. In some embodiments, the second homography matrix describes a projection from 2D camera coordinates to the 2D common plane. The baseball trajectory 308 in 3D space represents the actual baseball trajectory 105 and is depicted by the circles representing positions A, B, C, and D.

After tracking unit 160 converts the 2D baseball positions $a_1$-$b_1$-$c_1$-$d_1$ and $a_2$-$b_2$-$c_2$-$d_2$ from the respective 2D camera planes 301 and 302 to 2D common virtual plane 305, the respective positions A1-B1-C1-D1 and A2-B2-C2-D2 are fitted into lines to form the respective trajectories 306 and 307 for each camera 101 and 102. As seen in FIG. 4, the two trajectories 306 and 307 on the 2D common virtual plane intersect at position E, which indicates a position the baseball crosses the strike zone 107 along the baseball trajectory 308. By using this information, the strike zone position E is obtained for the baseball trajectory 308. Because the trajectories 306 and 307 intersect at position E, the tracking unit 160 determines the position E1 of trajectory 306 and position E2 of trajectory 307 equal to position E of baseball trajectory 308. This strike zone position E on 2D common plane 305 is then converted back to the respective 2D camera planes 301 and 302 of cameras 101 and 102, respectively. In some embodiments, the tracking unit 160 performs a 2D-to-2D projection using the second homography matrix. The projected point E1 and E2 (which are equal to E) to each of the respective camera planes 301 and 302, i.e., $e_1$ and $e_2$ is then determined. Once the projected point E ($e_1$ and $e_2$) is obtained, using a cross-ratio on any of the camera planes 301 or 302, the strike time, $t_E$, can be determined because the cross-ratio on the 2D virtual common plane 305 is identical as the cross ratio on 2D camera plane 301 as well as the 2D camera plane 302. In some embodiments, the tracking unit 160 determines the time the baseball moving along the trajectory 105 crosses the strike zone position i.e. target plane 107 using a cross-ratio of the plurality of different positions $a_1$-$b_1$-$c_1$-$d_1$ on 2D camera plane 301 and the projected back position E1 and a corresponding time stamp of the plurality of different positions and the projected back position in the 2D camera plane 301. Alternatively, the tracking unit 160 can determine the time the baseball moving along the trajectory 105 crosses the strike zone position or target plane 107 using a cross-ratio of the plurality of different positions or $a_2$-$b_2$-$c_2$-$d_2$ on 2D camera plane 302 and the projected back position E2 and a corresponding time stamp of the plurality of different positions and the projected back position 2D camera plane 302.

As described above, in some embodiments, a cross-ratio is applied to determine the strike-time. After obtaining the strike zone position for the baseball trajectory (for, e.g., point E), the strike zone location is projected to each camera plane, i.e., 2D camera plane 301 and 2D camera plane 302 to obtain corresponding pixel positions ($e_1$ and $e_2$, respectively). The obtained position is then used in cross-ratio equations to determine the strike-time ($t_E$). Each of points $e_1$ and $e_2$ were determined by back projection from the 2D common plane 305 (point "E") to each of the 2D camera planes 301, 302, using the second homography matrix.

In some embodiments, time at respective points $e_1$ and $e_2$ (i.e., $te_1$ and $te_2$) can then be determined using the cross-ratio equations described below. As point "E" is the common event, local camera time of camera 101 and camera 102 at respective points $e_1$ and $e_2$ (i.e., $te_1$ and $te_2$) is considered as a time reference for camera 101 and camera 102, respectively. Accordingly, the system and method described herein are referred to as event-based synchronization system and method.

For an object with a trajectory of 9p:

$$p \cong p_0 + v_0(t - t_0) + a_0 \frac{(t - t_0)^2}{2},$$

5 points are required to represent the movement of the object in 2D space for cross-ratio. Assuming points ($p_0$, $t_0$), ($p_1$, $t_1$), ($p_2$, $t_2$), ($p_3$, $t_3$), ($p_4$, $t_4$) with 2D space components of $q_0$, $q_1$, $q_2$, $q_3$, $q_4$:

$$X_q = \frac{\frac{((q_{1x} - q_{0x})(q_{2y} - q_{0y}) - (q_{1y} - q_{0y})(q_{2x} - q_{0x}))}{((q_{3x} - q_{0x})(q_{4y} - q_{0y}) - (q_{3y} - q_{0y})(q_{4x} - q_{0x}))}}{\frac{((q_{1x} - q_{0x})(q_{3y} - q_{0y}) - (q_{1y} - q_{0y})(q_{3x} - q_{0x}))}{((q_{2x} - q_{0x})(q_{4y} - q_{0y}) - (q_{2y} - q_{0y})(q_{4x} - q_{0x}))}}$$

$$X_t = \frac{(t_1 - t_2)(t_3 - t_4)}{(t_1 - t_3)(t_2 - t_4)}$$

Since $X_t = X_q$, the strike-time ($t_D$) can be determined using the following equation:

$$t_4 = \frac{(t_1 - t_2)t_3 - X_q(t_1 - t_3)t_2}{(t_1 - t_2) - X_q(t_1 - t_3)}$$

Figure 5:
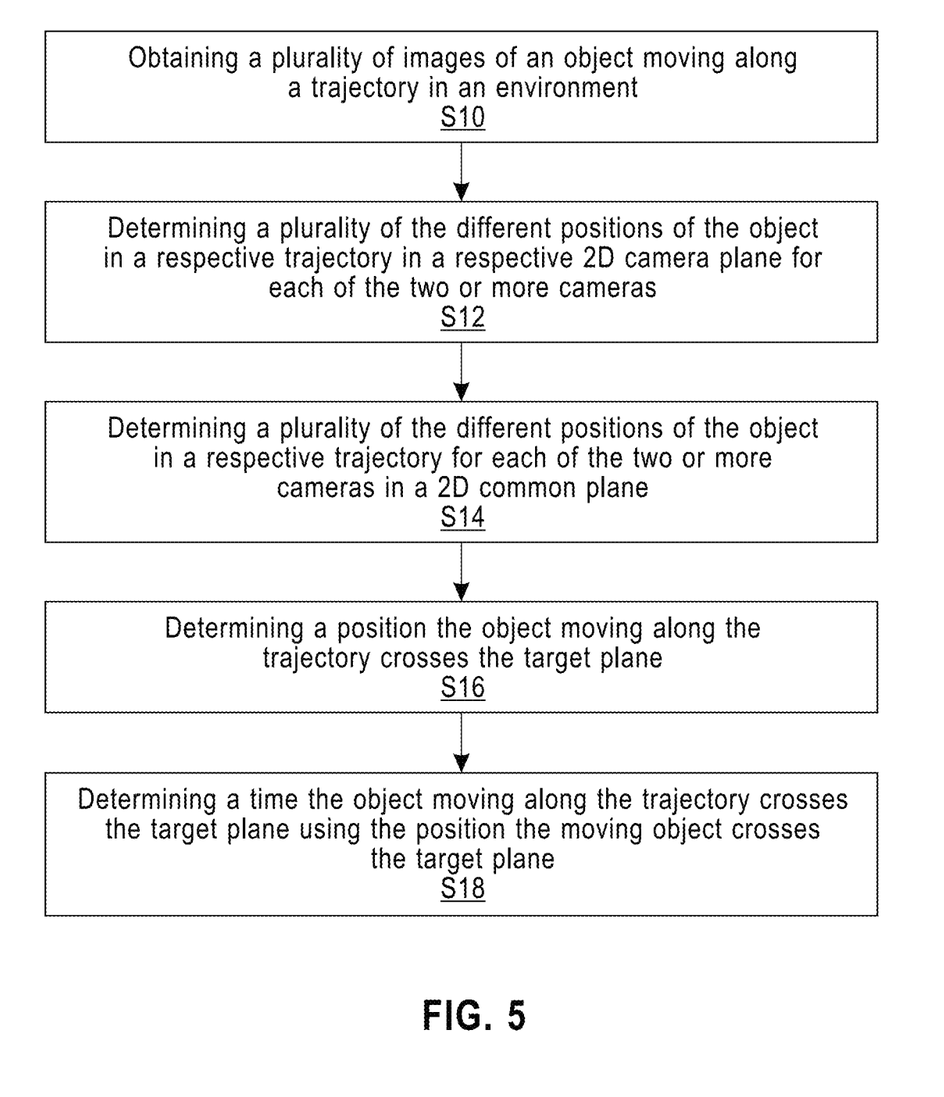
FIG. 5 is a flow diagram of one embodiment of a method for determining a time an object moving along a trajectory crosses a target plane.

FIG. 5 is a flow diagram of one embodiment of a method for determining a time an object moving along a trajectory crosses a target plane. In some embodiments, the method includes step S10 of obtaining a plurality of images of an object moving along a trajectory in an environment. In some embodiments, the plurality of images captures the object at different positions along the trajectory. In some embodiments, the plurality of images is obtained from two or more cameras positioned at different positions in the environment as described hereinabove. In some embodiments, each of the two or more cameras obtains the images at a different timing i.e. asynchronous cameras. In some embodiments, each of the two or more cameras has a field of view (FOV) that includes the trajectory of the moving object and the target plane. In some embodiments, the FOV of each of the two or more cameras additionally includes a launch position of the moving object. In some embodiments, the target plane is a plane that the moving object crosses during movement along the trajectory. In some embodiments, the target plane is a virtual plane. In some embodiments, the target plane is a common virtual plane.

In some embodiments, the method includes step S12 of determining a plurality of the different positions of the object in a respective trajectory in a respective 2D camera plane for each of the two or more cameras. In some embodiments, the method includes step S14 of determining a plurality of the different positions of the object in a respective trajectory for each of the two or more cameras in a 2D common plane using the plurality of different positions of the object in the respective trajectory in the 2D camera plane for each of the two or more cameras. In some embodiments, the method includes step S16 of determining a position the object moving along the trajectory crosses the target plane using the plurality of different positions of the object in the respective trajectory in the 2D common plane for each of the two or more cameras. In some embodiments, the method includes step S18 of determining a time the object moving along the trajectory crosses the target plane using the position the moving object crosses the target plane. In some embodiments, the object is a baseball thrown from the launch position toward a strike zone, the target plane is the strike zone, and the determined time is the time the baseball crosses the strike zone.

Figure 6:
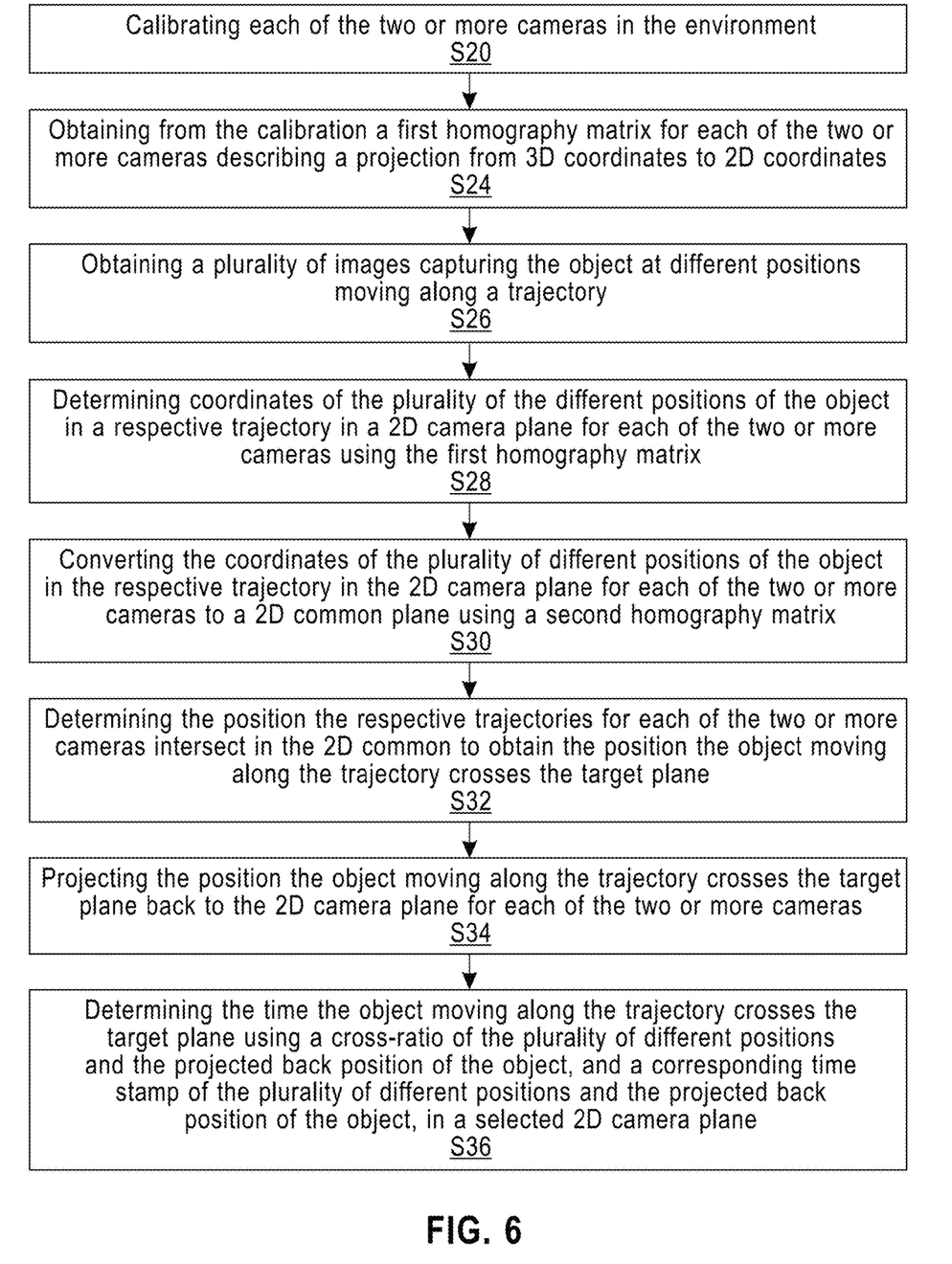
FIG. 6 is a flow diagram of another embodiment of a method for determining a time an object moving along a trajectory crosses a target plane.

FIG. 6 is a flow diagram of another embodiment of a method for determining a time an object moving along a trajectory crosses a target plane. In some embodiments, the method includes step S20 of calibrating each of the two or more cameras in the environment. In some embodiments, the method includes step S24 of obtaining from the calibration, a first homography matrix for each of the two or more cameras describing a projection from 3D coordinates (3D calibration pattern) to 2D coordinates (2D camera plane). In some embodiments, after step S24, the method includes step S26 of obtaining a plurality of images capturing the object at different positions moving along a trajectory. In some embodiments, the method includes step S28 of determining coordinates of the plurality of the different positions of the object in a respective trajectory in a 2D camera plane for each of the two or more cameras using the first homography matrix for each of the two or more cameras.

In some embodiments, the method includes step S30 of converting the coordinates of the plurality of different positions of the object in the respective trajectory in the 2D camera plane for each of the two or more cameras to a 2D common plane using a second homography matrix for each of the two or more cameras. Step S30 determines the plurality of different positions of the object in the respective trajectory in the 2D common plane for each of the two or more cameras. In some embodiments, the second homography matrix describes a projection from 2D camera coordinates to the 2D common plane.

In some embodiments, the method includes step S32 of determining the position the respective trajectories for each of the two or more cameras intersect in the 2D common plane to obtain the position the object moving along the trajectory crosses the target plane. In some embodiments, method includes step S34 of projecting the position the object moving along the trajectory crosses the target plane back to the 2D camera plane for each of the two or more cameras. In some embodiments, step S34 includes using the second homography matrix for projecting the position the object moving along the trajectory crosses the target plane back to the 2D camera plane for each of the two or more cameras. In some embodiments, method includes step S36 of determining the time the object moving along the trajectory crosses the target plane using a cross-ratio of the plurality of different positions and the projected back position of the object, and a corresponding time stamp of the plurality of different positions and the projected back position of the object, in a selected 2D camera plane. In some embodiments, once the parameters above are recovered, it may be possible to determine ball flight parameters, for e.g., using the "Trajectory Calculator" described in "Statcast and the Baseball Trajectory Calculator", David Kagan and Alan M. Nathan, Phys. Teach. 55, 134 (2017). The method described in the present disclosure including the method in FIG. 5 or 6 can be considered as being a method for synchronizing two or more cameras.

In some embodiments, more than one 2D common virtual planes may be constructed and used for object trajectory fitting. In an exemplary embodiment, three or more sequential 2D virtual planes crossings can be used to construct a ball trajectory that crosses these parallel planes. It is to be understood that the number of 2D virtual planes, their positions and orientation are configurable. In some embodiments, a 3D homography matrix for each of the two or more cameras can be obtained after calibrating each of the two or more cameras. In some embodiments, following the calibration, only a single 3D homography matrix is obtained for each camera calibrated. Multiple 2D virtual planes for each camera can then be generated or constructed based on this 3D homography matrix. After synchronizing the two or more cameras using the plane crossing, i.e., intersection for each virtual plane is obtained, the ball trajectory can be constructed. Since the multiple 2D virtual planes are generated from the same 3D homography matrix for each camera, even though there are changes to the selection of the 2D virtual planes (e.g. from a first set of 2D virtual planes to a second set of 2D virtual planes), calibration of each and every 2D virtual plane is not necessary. In some embodiments, 2D virtual planes may be constructed to cover the entire sports field. As some 2D virtual planes are more reliable or suitable for trajectory fitting purposes, pitch or density of the virtual planes may need to be adjusted. As mentioned above, advantageously, no further calibration of the new or adjusted 2D virtual planes is required.

Figure 7:
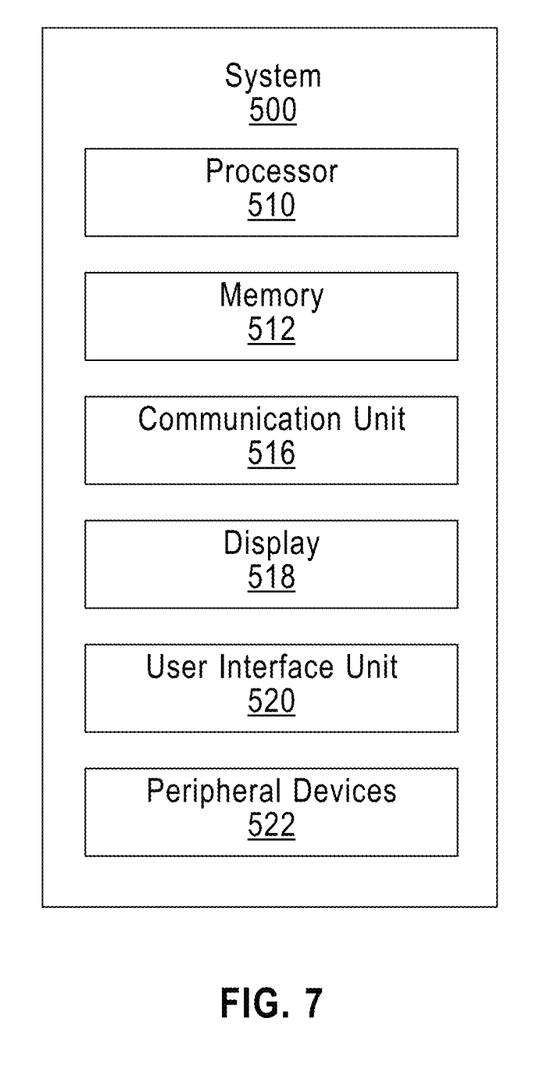
FIG. 7 illustrates a block diagram of an example a computing system for use in embodiments of the present disclosure.

FIG. 7 illustrates an example system 500 that may be used for computer system 200 of FIG. 1 in accordance with at least one embodiment described in the present disclosure.

The system 500 may include a processor 510, memory 512, a communication unit 516, a display 518, a user interface unit 520, and a peripheral device 522, which all may be communicatively coupled. In some embodiments, the system 500 may be part of any of the systems or devices described in this disclosure. For example, the system 500 may be part of the controller 110 of FIG. 1. Additionally, or alternatively, the system 500 may be part of the computing system 200 of FIG. 1.

Generally, the processor 510 may include any computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 510 may include any number of processors distributed across any number of networks or physical locations that are configured to perform individually or collectively any number of operations described in this disclosure. In some embodiments, the processor 510 may interpret and/or execute program instructions and/or process data stored in the memory 512. In some embodiments, the processor 510 may execute the program instructions stored in the memory 512.

For example, in some embodiments, the processor 510 may execute program instructions stored in the memory 512 that are related to, for example, simulating a trajectory of an object such that the system 500 may perform or direct the performance of the operations associated therewith as directed by the instructions. In these and other embodiments, instructions may be used to perform one or more operations of the method described in FIGS. 5 and 6 above.

The memory 512 may include computer-readable storage media or one or more computer-readable storage mediums for carrying or having computer-executable instructions or data structures stored thereon. Such computer-readable storage media may be any available media that may be accessed by a computer, such as the processor 510. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media. Computer-executable instructions may include, for example, instructions and data configured to cause the processor 510 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten*, 500 F.3d 1346

(Fed. Cir. 2007). Combinations of the above may also be included within the scope of computer-readable media.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, cellular communication facilities, etc.), and/or the like. The communication unit 516 may permit data to be exchanged with a network and/or any other devices or systems described in the present disclosure.

The display 518 may be configured as one or more displays, like an LCD, LED, a monitor, a screen, or other type of display. The display 518 may be configured to output shot data such as a simulated trajectory of an object, flight mapping, media content, and club identification; a schematic or representation of an environment in which the object traveled at some point during the trajectory, user interfaces, and other data as directed by the processor 510.

The user interface unit 520 may include any device to allow a user to interface with the system 500. For example, the user interface unit 520 may include a mouse, a track pad, a keyboard, buttons, and/or a touchscreen, among other devices. The user interface unit 520 may receive input from a user and provide the input to the processor 510. In some embodiments, the user interface unit 520 and the display 518 may be combined. For example, a user may select, via the user interface unit 520, a target region at which placement of the object is desired.

The peripheral devices 522 may include one or more devices. For example, the peripheral devices may include a sensor, a microphone, and/or a speaker, among other peripheral devices. In these and other embodiments, the microphone may be configured to capture audio. The speaker may broadcast audio received by the system 500 or otherwise generated by the system 500. The sensor may be configured to sense changes in light, pixels, sound, motion, rotation, position, orientation, magnetization, acceleration, tilt, vibration, force, speed, color, wind, etc.

Modifications, additions, or omissions may be made to the system 500 without departing from the scope of the present disclosure. For example, in some embodiments, the system 500 may include any number of other components that may not be explicitly illustrated or described. Further, depending on certain implementations, the system 500 may not include one or more of the components illustrated and described.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention is not to be limited to the exact forms and details described and illustrated but fall within the scope of the appended claims.

What is claimed is:

1. A method, comprising:
obtaining a plurality of images of an object moving along a trajectory in an environment, the plurality of images capturing the object at different positions along the trajectory, the plurality of images being obtained from two or more cameras positioned at different positions in the environment, each of the two or more cameras being in communication with at least one processor, each of the two or more cameras having a field of view (FOV) that includes the trajectory of the moving object and a target plane, the target plane being a plane that the moving object crosses during movement along the trajectory, each of the two or more cameras obtaining the images at a different timing;
determining, by the at least one processor, a plurality of the different positions of the object in a respective trajectory in a respective 2D camera plane for each of the two or more cameras;
determining, by the at least one processor, a plurality of the different positions of the object in a respective trajectory for each of the two or more cameras in a 2D common plane using the plurality of different positions of the object in the respective trajectory in the 2D camera plane for each of the two or more cameras; and
determining, by the at least one processor, a position the object moving along the trajectory crosses the target plane using the plurality of different positions of the object in the respective trajectory in the 2D common plane for each of the two or more cameras.

2. The method according to claim 1, further comprising determining, by the at least one processor, a time the object moving along the trajectory crosses the target plane using the position the moving object crosses the target plane.

3. The method according to claim 1, further comprising using a first homography matrix obtained from calibrating each of the two or more cameras for determining coordinates of the plurality of different positions of the object in the respective trajectory in the 2D camera plane for each of the two or more cameras.

4. The method according to claim 3, wherein determining the plurality of different positions of the object in the respective trajectory in the 2D common plane for each of the two or more cameras includes converting the coordinates of the plurality of different positions of the object in the respective trajectory in the 2D camera plane for each of the two or more cameras to the common plane using a second homography matrix for each of the two or more cameras, the second homography matrix describing a projection from 2D camera coordinates to the 2D common plane.

5. The method according to claim 4, wherein determining the position the object moving along the trajectory crosses the target plane comprises determining the position the respective trajectories for each of the two or more cameras intersect in the 2D common plane.

6. The method according to claim 5, wherein determining the time the object moving along the trajectory crosses the target plane includes projecting back the position the object moving along the trajectory crosses the target plane to the 2D camera plane for each of the two or more cameras.

7. The method according to claim 6, further comprising using the second homography matrix for projecting the position the object moving along the trajectory crosses the target plane back to the 2D camera plane for each of the two or more cameras.

8. The method according to claim 6, further comprising using a cross-ratio of the plurality of different positions and the projected back position of the object, and a corresponding time stamp of the plurality of different positions and the projected back position of the object, in a selected 2D camera plane for determining the time the object moving along the trajectory crosses the target plane.

9. The method according to claim 8, wherein the time the object moving along the trajectory crosses the target plane is a local camera time for each of the two or more cameras.

10. The method according to claim 9, wherein the object is a baseball thrown from a launch position toward a strike zone, the target plane is the strike zone, and the determined time is the time the baseball crosses the strike zone.

11. A system comprising:
two or more cameras positioned at different positions in an environment;
one or more processors in communication with the two or more cameras; and
non-transitory computer readable media that include instructions thereon that, in response to execution by the one or more processors, control performance of operations of the one or more processors, the operations comprising:
obtaining a plurality of images of an object moving along a trajectory in the environment, the plurality of images capturing the object at different positions along the trajectory, the plurality of images being obtained from the two or more cameras, each of the two or more cameras having a field of view (FOV) that includes the trajectory of the moving object and a target plane, the target plane being a plane that the moving object crosses during movement along the trajectory, each of the two or more cameras obtaining the images at a different timing;
determining a plurality of the different positions of the object in a respective trajectory in a respective 2D camera plane for each of the two or more cameras;
determining a plurality of the different positions of the object in a respective trajectory for each of the two or more cameras in a 2D common plane using the plurality of different positions of the object in the respective trajectory in the 2D camera plane for each of the two or more cameras; and
determining a position the object moving along the trajectory crosses the target plane using the plurality of different positions of the object in the respective trajectory in the 2D common plane for each of the two or more cameras.

12. The system according to claim 11, wherein the operations further comprising determining a time the object moving along the trajectory crosses the target plane using the position the moving object crosses the target plane.

13. The system according to claim 11, wherein each of the two or more cameras has been calibrated to obtain a first homography matrix and the first homography matrix for each of the two or more cameras is used for determining coordinates of the plurality of different positions of the object in the respective trajectory in the 2D camera plane for each of the two or more cameras.

14. The system according to claim 13, wherein determining the plurality of different positions of the object in the respective trajectory in the 2D common plane for each of the two or more cameras includes converting the coordinates of the plurality of different positions of the object in the respective trajectory in the 2D camera plane for each of the two or more cameras to the common plane using a second homography matrix for each of the two or more cameras, the second homography matrix describing a projection from 2D camera coordinates to the 2D common plane.

15. The system according to claim 14, wherein determining the position the object moving along the trajectory crosses the target plane comprises determining the position the respective trajectories for each of the two or more cameras intersect in the 2D common plane.

16. The system according to claim 15, wherein determining the time the object moving along the trajectory crosses the target plane includes using the second homography matrix for projecting back the position the object moving along the trajectory crosses the target plane to the 2D camera plane for each of the two or more cameras.

17. The system according to claim 16, further comprising using a cross-ratio of the plurality of different positions and the projected back position of the object, and a corresponding time stamp of the plurality of different positions and the projected back position of the object, in a selected 2D camera plane for determining the time the object moving along the trajectory crosses the target plane.

18. The system according to claim 11, wherein the FOV further includes a launch position of the moving object and wherein the object is a baseball thrown from the launch position toward a strike zone, the target plane is the strike zone, and the determined time is the time the baseball crosses the strike zone.

19. A non-transitory computer readable media that include instructions thereon that, in response to execution by one or more processors, control performance of operations of the one or more processors, the operations comprising:
obtaining a plurality of images of an object moving along a trajectory in an environment, the plurality of images capturing the object at different positions along the trajectory, the plurality of images being obtained from two or more cameras positioned at different positions in the environment, each of the two or more cameras having a field of view (FOV) that includes the trajectory of the moving object and a target plane, the target plane being a plane that the moving object crosses during movement along the trajectory, each of the two or more cameras obtaining the images at a different timing;
determining a plurality of the different positions of the object in a respective trajectory in a respective 2D camera plane for each of the two or more cameras;
determining a plurality of the different positions of the object in a respective trajectory for each of the two or more cameras in a 2D common plane using the plurality of different positions of the object in the respective trajectory in the 2D camera plane for each of the two or more cameras; and
determining a position the object moving along the trajectory crosses the target plane using the plurality of different positions of the object in the respective trajectory in the 2D common plane for each of the two or more cameras.

20. The non-transitory computer readable media according to claim 19, wherein the operations further comprising determining a time the object moving along the trajectory crosses the target plane using the position the moving object crosses the target plane.

21. The non-transitory computer readable media according to claim 19, wherein the operations further comprising:
calibrating each of the two or more cameras in the environment using a calibration pattern to obtain a first homography matrix for each of the two or more cameras and using the first homography matrix for determining coordinates of the plurality of different positions of the object in the respective trajectory in the 2D camera plane for each of the two or more cameras,
wherein determining the plurality of different positions of the object in the respective trajectory in the 2D common plane for each of the two or more cameras includes converting the coordinates of the plurality of different positions of the object in the respective trajectory in the 2D camera plane for each of the two or more cameras to the common plane using a second homography matrix for each of the two or more cameras, the second homography matrix describing a projection from 2D camera coordinates to the 2D common plane, and wherein determining the position the object moving along the trajectory crosses the target plane comprises determining the position the respective trajectories for each of the two or more cameras intersect in the 2D common plane.

22. The non-transitory computer readable media according to claim 20, wherein determining the time the object moving along the trajectory crosses the target plane includes using the second homography matrix for projecting back the position the object moving along the trajectory crosses the target plane to the 2D camera plane for each of the two or more cameras, and wherein determining the time the object moving along the trajectory crosses the target plane comprises using a cross-ratio of the plurality of different positions and the projected back position of the object, and a corresponding time stamp of the plurality of different positions and the projected back position of the object, in a selected 2D camera plane for determining the time the object moving along the trajectory crosses the target plane.

* * * * *